Oct. 27, 1953 S. P. BELSINGER Re. 23,729

HEAVY-DUTY FIBER CONTAINER

Original Filed March 1, 1950 3 Sheets-Sheet 1

INVENTOR
Samuel P. Belsinger,

BY Mason, Porter, Siller & Stewart
ATTORNEYS

Oct. 27, 1953 S. P. BELSINGER Re. 23,729
HEAVY-DUTY FIBER CONTAINER
Original Filed March 1, 1950 3 Sheets-Sheet 2
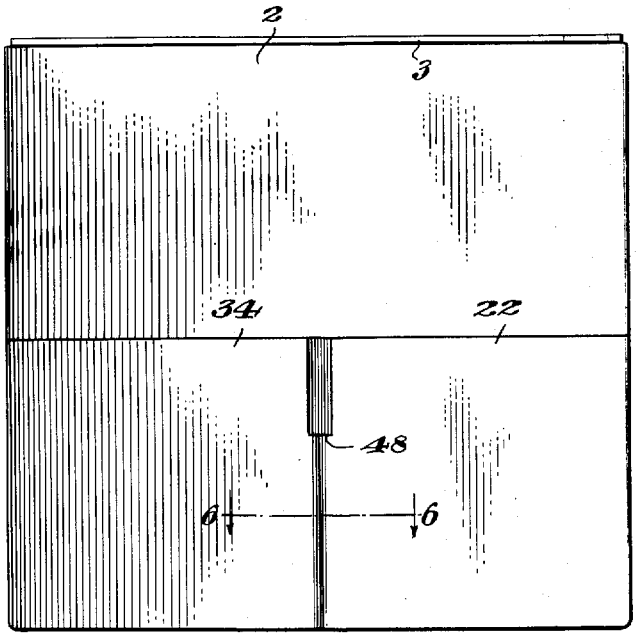
Fig. 2.
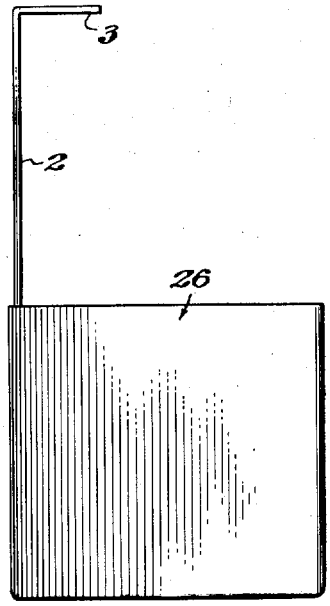
Fig. 3.
Fig. 4.
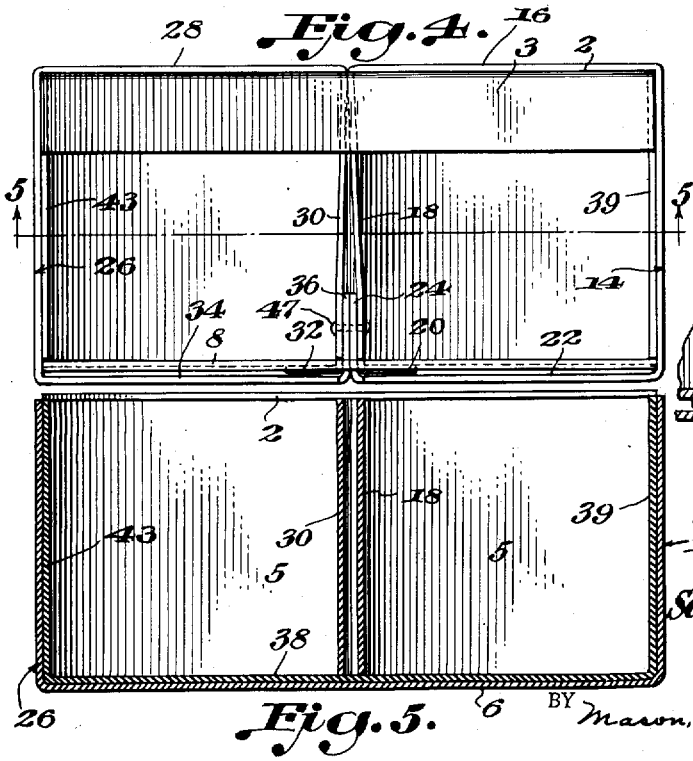
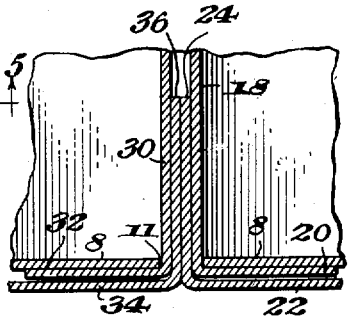
Fig. 6.
Fig. 5.
INVENTOR
Samuel P. Belsinger,
BY Mason, Porter, Siller & Stewart
ATTORNEYS Oct. 27, 1953 S. P. BELSINGER Re. 23,729

HEAVY-DUTY FIBER CONTAINER

Original Filed March 1, 1950 3 Sheets-Sheet 3

INVENTOR

Samuel P. Belsinger.

BY Mason, Porter, Diller & Stewart

ATTORNEYS.

Reissued Oct. 27, 1953 Re. 23,729

UNITED STATES PATENT OFFICE 23,729

HEAVY-DUTY FIBER CONTAINER

Samuel P. Belsinger, Atlanta, Ga., assignor to Belsinger, Inc., Atlanta, Ga., a corporation of Georgia Original No. 2,578,777, dated December 18, 1951, Serial No. 147,008, March 1, 1950. Application for reissue July 29, 1953, Serial No. 371,196

3 Claims. (Cl. 229—16)

Matter enclosed in heavy brackets [ ] appears in the original patent but forms no part of this reissue specification; matter printed in italics indicates the additions made by reissue.

The invention relates to new and useful improvements in a foldable fiber container, which is especially adapted for heavy duty work such as crating eggs, oranges and the like for rail or truck shipment.

An object of the invention is to provide a heavy duty container which may be made by slitting and scoring rectangular fiber blanks wherein the container when assembled is provided with double side walls, double end walls and a double bottom wall.

Another object of the invention is to provide a double wall container of the above type wherein a double wall partition extends from one side of the container to the other and from the bottom to the top of the container for forming two substantially identical cells of equal capacity.

A still further object of the invention is to provide a double wall container of the above type wherein the partition members are each provided with a flap at the free end thereof, which flap extends through a slot in the inner member of a double side wall with the flaps folded so as to lie between the members of said double side wall.

A still further object of the invention is to provide a double wall container of the above type wherein the outer member of the front side wall is formed of half wall sections and each half section is provided with a flap adapted to extend through said slot and between the partition members so that a single locking means may be used if desired for joining the partition members and the flaps therebetween for rigidly holding the container in assembled condition.

A still further object of the invention is to provide a double wall container of the above type wherein there is a double wall cover.

In the drawings:

Figure 2 is a front view of the completely assembled container with cover in raised position;

Figure 3 is an end view of the container with the cover in the raised position;

Figure 4 is the plan view of the container as shown in Figure 2;

Figure 5 is a vertical sectional view on the line 5—5 of Figure 4;

Figure 6 is a horizontal section of a portion of the container on the line 6—6 of Figure 2;

The invention has to do with a heavy duty fiber container which is made from blanks, preferably of corrugated board. One of the blanks is slit along parallel lines so as to provide side walls which are integral with the bottom of the container, and a cover which is integral with the rear side wall. These slits also provide end walls which are integral with the bottom, and half side sections which project laterally from the end sections. These slits also provide partition sections which are integral with the rear half sections of the container. The side walls are also slit intermediate their ends to provide a slot extending the full height of the rear wall and extending upwardly from the bottom, but terminating short of the top of the front wall.

The blank thus formed may be assembled into a heavy duty container by merely folding the blank so as to position the side walls, the end walls, the side wall half sections and the inserting of the partition walls through the slot in the rear wall of the container. This blank and the container formed thereby is shown and described and claimed in my copending application, Serial No. 147,007, *now Patent No. 2,578,776*, filed on even date herewith.

The present invention has to do with a container wherein there are additional features of structure which enables a container to be produced which has a double wall bottom, double wall ends and double wall front and rear side members. These additional features are formed from a second blank which is scored so that it may be folded and inserted in the container to form a double bottom wall and double end walls.

Figure 1:
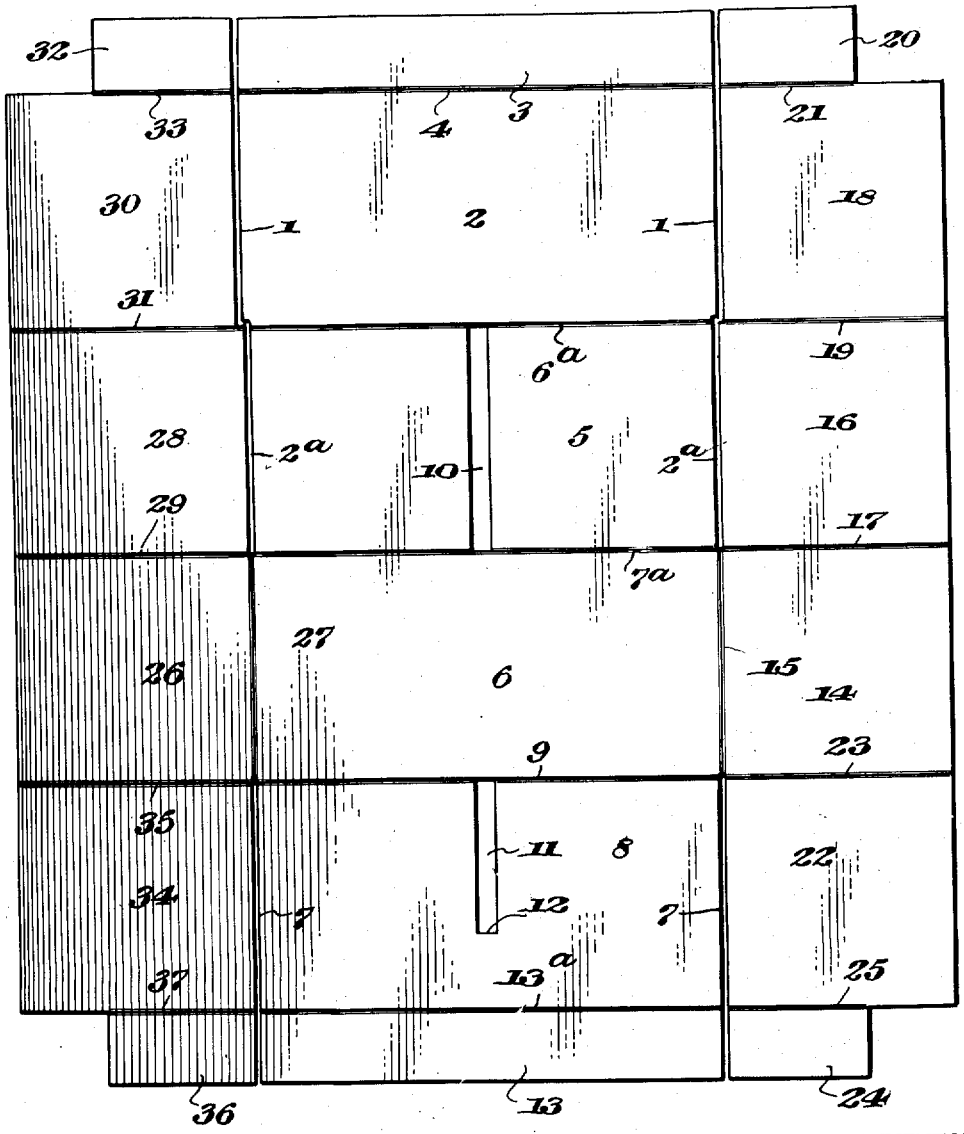
Figure 1 is a plan view of a fiber blank which has been slit and scored so that a container may be formed therefrom by folding and assembling the members produced by the slitting and scoring of the blank.

Referring more in detail to the drawings, the main blank from which the heavy duty container is formed is shown in Figure 1. The blank is slit along the lines 1—1 which are parallel to each other. This provides a cover section indicated at 2. The cover section may be provided with a flap 3 separated from the cover by a score line 4. The body blank is also slit along the lines 2a—2a which are parallel with each other, thus forming a rear side wall 5 which is separated from the cover by a score line 6a. The rear side wall 5 is integral with the bottom portion 6 and separated therefrom by a score line 7a. The blank is also cut along parallel lines 7—7 and this forms the front wall 8 which is integral with the bottom 6 and separated therefrom by a score line 9. The side wall 8 is provided with a flap 13 that is separated from the side wall by a score line 13a. This flap is foldable outwardly onto the outer face of the side wall 8 when the blank is in assembled position.

The rear wall 5 midway between the ends thereof is provided with a slot 10 which extends from the bottom wall to the cover when the blank is in assembled position. The front wall is provided with a slot 11 which extends from the bottom only part way up the side leaving a space between the upper end 12 of the slot and the top edge of the front side wall.

A blank is provided with an end wall 14 which is formed integral with one end of the bottom 6 and separated therefrom by a score line 15. At one side of the end wall 14 is a half section side wall 16. This half side wall section 16 is formed integral with the end wall, but is separated from the side wall 5 by the slit 2a. The blank is scored at 17 between the half side wall and the end wall. This half side wall 16 is formed integral with a partition wall 18 and is separated therefrom by the score line 19. The partition 18 carries flaps 20 which are separated from the partition by score line 21.

At the other side of the end 14 is a half side section 22 which is separated from the end section by a score line 23. This half side section 22 carries a flap 24 which is separated from the half side section by a score line 25.

At the other end of the bottom 6 is an end wall 26. This end wall is separated from the bottom by a score line 27. Extending laterally from one side of the end wall is a half section side wall 28 which is separated from the end wall by score line 29 and is also separated from the side wall 5 by the slit 2a. Integral with this half side wall section 28 is a partition wall 30 which is separated from the half side section by the score line 31. Integral with this partition section 30 is a flap 32 which is separated therefrom by a score line 33. On the other side of the end section 26 is a half side section 34 which is separated from the end section by a score line 35. This half side section carries a flap 36 which is separated from the side section by a score line 37.

Figure 7:
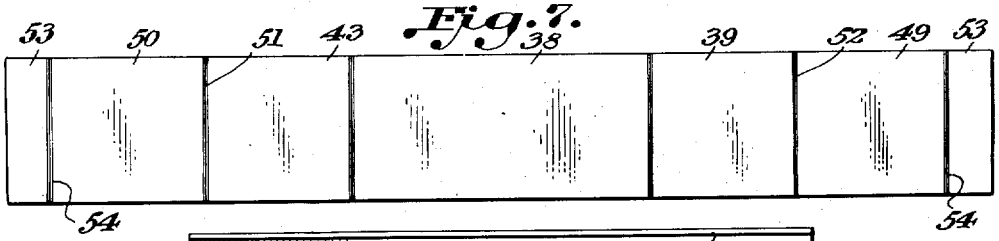
Figure 7 is a plan view of a modified form of blank which is assembled with the blank shown in Figure 1, so as to provide not only a double bottom wall and double end walls, but also cover sections which are integral with the inner end walls and are provided with flaps that engage between the partition members.

The second body blank includes an inner body wall and end walls at each end thereof. The bottom wall extends from end to end of the container on the inside thereof and the end walls terminate at the upper ends of the outer end walls 14 and 26 respectively. When the blanks are assembled together to make a double wall container, the blank just described will include sections 38, 39 and 43 as shown in Figure 7, without the cover extensions 49 and 50. The section 38 extends along the bottom wall from end to end thereof as noted and from front to rear side of the bottom wall. The sections 39 and 43 are dimensioned so that they contact with the inner face of the outer end walls 14 and 26 respectively.

These blanks which have just been described may be shipped by the manufacturer to the user who can readily fold the parts and assemble the two blanks so as to provide a container having double front and rear side walls, double end walls and a double bottom wall. There are possibly various ways in which the parts may be assembled, and one way is to bend the side wall 5 to a position at right angles to the bottom wall, bend the end walls 14 and 26 to a position at right angles to the bottom wall, then place the other blank in folded condition on the bottom wall with the inner sections of the end walls in contact with the inner faces of the outer sections. Then the front side wall is bent to an upright position after which the half rear side walls are folded along the fold lines 17 and 29 respectively so as to lie close to the outer face of the rear wall 5. In this folding of the rear half sections the partition members 18 and 30 are inserted through the slot 10. These partition members will extend across the bottom and the flaps will extend through the slot 11, after which the flaps are folded back flat against the outer face of the rear front wall. The half front side sections 22 and 34 are then folded along the outer face of the inner side wall 8 and the flaps 24 and 36 bent and inserted through the slot 11 and between the partition members.

As shown in Figure 6, the flap 20 on the partition wall 18 extends through the slot 11 in the front side wall and is folded back against the inner section 8 of the front side wall. Likewise, the flap 32 extends through the slot 11 and is folded back against the outer face of the inner wall section 8. These flaps lie between the inner walls 8 and the outer wall half sections 22 and 34. The flap 24 extends through the slot 11 and between the partition walls 18 and 30. Likewise, the flap 36 extends through the slot 11 and between the partitions.

As shown in Figure 4, a fastening pin or staple 47 may be inserted through the partition walls 18 and 30 and also through the flaps 24 and 36, and thus all of the walls of the container will be firmly held in rigid relation to each other. By removing these staples, both blanks may be folded to a relatively flat position for return shipment and reuse.

It is noted that the flaps on the partition sections and the flaps on the half side wall sections 22 and 34 do not extend to the full height of the front container wall. In the assembled container they terminate at the line 48. This is the upper end of the slot 11. This leaves a space between the outer half side wall and the inner side wall section and when the cover is provided with a flap 3 this flap may be inserted between the walls. It is noted that the slitting and the scoring will be positioned so as to leave ample tolerance for folding and assembling of the container. For example, the partition walls 30 and 18 will be so shaped and disposed along their bottom edges as to be spaced away from the bottom wall 6 when in assembled position so as to leave ample clearance for the inner section 38 of the bottom wall. See Figure 5.

As has been noted, the cover 2 is of slightly greater length than the bottom 5, and, therefore, these folded back sections together with the central partition forms a very rigid support for the cover when in closed position.

Figure 9:
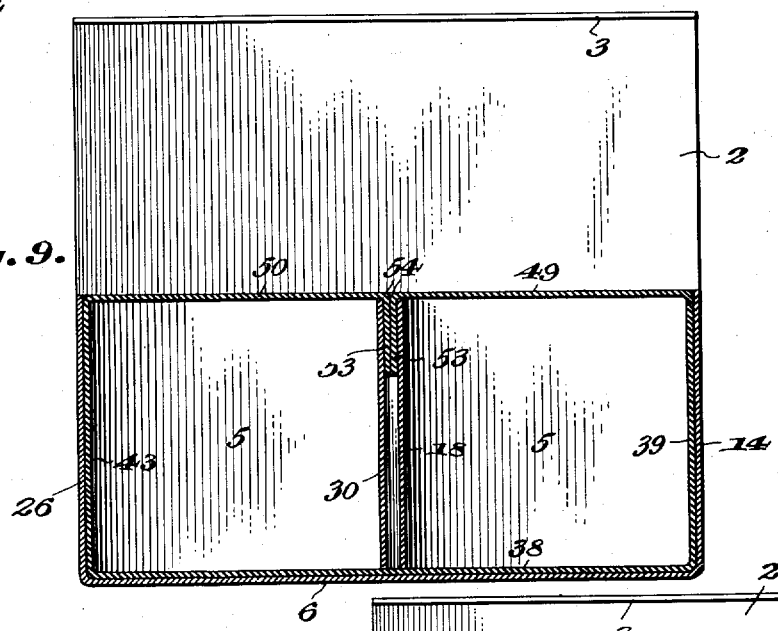
Figure 9 is a vertical sectional view longitudinally of the container with the folded blank shown in Figure 8 in position in the container formed by the folding of the blank shown in Figure 1.
Figure 8:
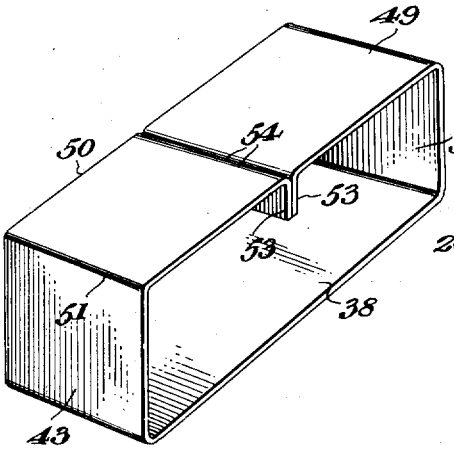
Figure 8 is a view in perspective of the blank shown in Figure 7 with the parts folded to the position they will assume in the assembled container.

In a modified form of the invention, the second blank described is lengthened. From this blank is produced the inner section 38 of the bottom wall, and the inner sections 39 and 43 of the end walls. The blank is extended so as to provide an inner half cover section 49 which is integral with the inner end section 39 and an inner half cover section 50 which is integral with the inner end wall section 43. These cover sections are separated from the respective end wall sections by score lines 51 and 52. Each cover section carries a flap 53 which is separated from the inner cover sections by score lines 54, 54 respectively. These flaps 53, 53 are shown in closed position in Figure 9. The cover 2 is in raised position. After the container is filled then the half cover sections are moved down to closed positions and the flaps 53 inserted between the partition members, then the main cover 2 is moved to closed position and flap 3, if used, is inserted between the front and rear members of the front wall.

In this modified form the container not only has double bottom walls, double end walls and double side walls, but it also has a double top wall or cover. In order to seal the container for shipment it may be taped in the usual way by a tape extending along the upper and front edge of the container and overlapping the cover and the front wall.

Figure 10:
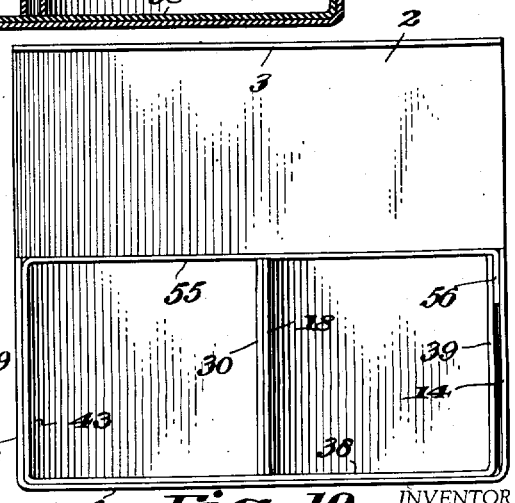
Figure 10 is a view similar to Figure 9, but showing a modified form of inner cover.

In Figure 10 there is a further modified form of cover arrangement. In this form the member 43 of the inner or liner wall has an extension 55 which extends from one end of the container to the other. This extension carries a flap 56 which is adapted to be inserted between the end wall 14 and the liner wall 39. After the container has been filled this inner cover 55 is moved to closed position and then the outer cover is folded down onto the inner cover, thus making a double wall cover for the container.

It is obvious that minor changes in the details of construction may be employed without departing from the spirit of the invention as set forth in the appended claims.

I claim:

1. A foldable heavy duty container formed from two substantially rectangular blanks, said blanks being scored and slit so as to provide when assembled for use a container having a double bottom wall, double front and rear side walls, double end walls and a double partition wall integral with thee outer members of the rear side wall, *said double partition wall extending through a slot in the inner member of the rear side wall* and having flaps extending through a slot in the inner member of the front side wall, said flaps being folded so as to lie between the inner and outer members of said front wall, said outer member of the front wall being formed of half sections, each of which is provided with a flap adapted to extend through the slot in the inner member of the front wall and between the members of the partition wall, said rear wall having a cover formed integral therewith and adapted to be folded down into contact with the end walls and the partition for closing the container.

2. A foldable heavy duty container formed from two substantially rectangular blanks, said blanks being scored and slit so as to provide when assembled for use a container having a double bottom wall, double front and rear side walls, double end walls and a double partition wall integral with the outer members of the rear side wall, *said double partition wall extending through a slot in the inner member of the rear side wall* and having flaps extending through a slot in the inner member of the front side wall, said flaps being folded so as to lie between the inner and outer members of said front wall, said outer member of the front wall being formed of half sections, each of which is provided with a flap adapted to extend through the slot in the inner member of the front wall and between the members of the partition wall, and means for joining the partition walls and the flaps for rigidly holding the container in assembled condition 3. A foldable heavy duty container formed from two substantially rectangular blanks, said blanks being scored and slit so as to provide when assembled for use a container having a double bottom wall, double front and rear side walls, double end walls and a double partition wall integral with the outer members of the rear side wall, *said double partition wall extending through a slot in the inner member of the rear side wall* and having flaps extending through a slot in the inner member of the front side wall, said flaps being folded so as to lie between the inner and outer members of said front wall, said outer member of the front wall being formed of half sections, each of which is provided with a flap adapted to extend through the slot in the inner member of the front wall and between the members of the partition wall, an inner cover extending lengthwise of the container and an outer cover extending transversely of the container thus providing a double wall closure for such container.

SAMUEL P. BELSINGER.

References Cited in the file of this patent or the original patent

UNITED STATES PATENTS

| Number | Name | Date |
|---|---|---|
| 221,244 | Matchett | Nov. 4, 1879 |
| 893,652 | Reber | July 21, 1908 |
| 2,404,704 | Guyer | July 23, 1946 |
| 2,457,291 | Wenzel | Dec. 28, 1948 |